United States Patent
Gharib et al.

(10) Patent No.: US 10,060,188 B2
(45) Date of Patent: Aug. 28, 2018

(54) DRIVESHAFT CATCH ASSEMBLY

(71) Applicant: HALLIBURTON ENERGY SERVICES, INC., Houston, TX (US)

(72) Inventors: Hossam Mohamed Gharib, Edmonton (CA); Steven Graham Bell, Red Deer (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/119,136

(22) PCT Filed: Apr. 16, 2015

(86) PCT No.: PCT/US2015/026178
§ 371 (c)(1),
(2) Date: Aug. 16, 2016

(87) PCT Pub. No.: WO2016/167772
PCT Pub. Date: Oct. 20, 2016

(65) Prior Publication Data
US 2017/0058606 A1    Mar. 2, 2017

(51) Int. Cl.
*E21B 4/00* (2006.01)
*F16C 17/10* (2006.01)
*F16C 35/02* (2006.01)
*E21B 17/00* (2006.01)
*F16D 3/02* (2006.01)
(Continued)

(52) U.S. Cl.
CPC .............. *E21B 4/003* (2013.01); *E21B 17/00* (2013.01); *E21B 41/0021* (2013.01); *F16C 17/10* (2013.01); *F16C 35/02* (2013.01); *F16D 3/02* (2013.01); *E21B 4/02* (2013.01); *F16C 2352/00* (2013.01)

(58) Field of Classification Search
CPC ... E21B 4/02; E21B 4/003; E21B 4/00; E21B 41/0021; E21B 17/046; F16C 17/10; F16C 35/02; F16C 2352/00; F16D 3/02
See application file for complete search history.

(56) References Cited

U.S. PATENT DOCUMENTS

| 6,070,678 A | 6/2000 | Pascale |
| 6,561,290 B2 | 5/2003 | Blair et al. |

(Continued)

FOREIGN PATENT DOCUMENTS

WO    2014126889    8/2014

OTHER PUBLICATIONS

International Patent Application No. PCT/US2015/026178, International Search Report and Written Opinion, dated Nov. 23, 2015, 7 pages.

*Primary Examiner* — Nicole Coy
(74) *Attorney, Agent, or Firm* — Kilpatrick Townsend & Stockton LLP

(57) ABSTRACT

A driveshaft transmission assembly may include a catch assembly. The catch assembly may prevent the loss of certain driveshaft transmission assembly components downhole in the event of a failure of the driveshaft transmission due to dynamic loads produced during operation of a drilling system. The catch assembly may be coupled to a first radial bearing assembly using locking devices. The driveshaft transmission assembly may also include a second radial bearing assembly interlockably coupled to a thrust bearing and a bearing housing.

20 Claims, 8 Drawing Sheets

(51) Int. Cl.
*E21B 41/00* (2006.01)
*E21B 4/02* (2006.01)

(56) References Cited

U.S. PATENT DOCUMENTS

| | | |
|---|---|---|
| 6,827,162 B2 | 12/2004 | Fisher |
| 7,117,939 B1 | 10/2006 | Hawley et al. |
| 7,267,185 B2 | 9/2007 | Underwood et al. |
| 7,445,061 B1 | 11/2008 | Falgout, Sr. et al. |
| 7,658,243 B1 * | 2/2010 | Salzer, III ............... E21B 4/003 175/107 |
| 8,025,110 B2 | 9/2011 | Falgout, Jr. et al. |
| 2003/0102167 A1 | 6/2003 | Dugas et al. |
| 2004/0129430 A1 | 7/2004 | Tessier et al. |
| 2009/0020337 A1 | 1/2009 | Swietlik et al. |
| 2010/0122849 A1 | 5/2010 | Salzer, III et al. |
| 2010/0314172 A1 | 12/2010 | Underwood et al. |
| 2012/0325561 A1 * | 12/2012 | Leblanc ................. E21B 4/003 175/107 |
| 2013/0092445 A1 * | 4/2013 | Baudoin ................. E21B 4/02 175/107 |
| 2013/0146305 A1 | 6/2013 | Dupal et al. |
| 2015/0368985 A1 * | 12/2015 | Eppink .................... E21B 3/00 175/57 |
| 2016/0298395 A1 * | 10/2016 | Baudoin ............... E21B 17/046 |

* cited by examiner

DRIVESHAFT CATCH ASSEMBLY

CROSS-REFERENCE TO RELATED APPLICATIONS

This is a U.S. national phase under 35 U.S.C. 371 of International Patent Application No. PCT/US2015/026178, titled "Driveshaft Catch Assembly" and filed Apr. 16, 2015, the entirety of which is incorporated herein by reference.

TECHNICAL FIELD

The present disclosure relates generally to an assembly for a driveshaft transmission and, more particularly (although not necessarily exclusively), to a driveshaft catch assembly to prevent the loss of driveshaft transmission assembly components.

BACKGROUND

Mud motors utilize fluid energy converted to mechanical energy to provide shaft rotation to a drill string or drill bit. Because the mud motor is a highly loaded section of a drilling tool, it is prone to critical damage during motor transmission failure. Failure of the motor transmission may result in critical damage to the transmission assembly, including the separation of components from the transmission assembly. Where such separation occurs, these components may be lost downhole. The lost components dropped downhole can prevent further progression in drilling and can cause significant delays. The loss of components downhole may even result in a drilling project being abandoned.

A procedure known as "fishing" is sometimes used to retrieve the lost components, but this procedure is costly and time-consuming, and may be ineffective.

DETAILED DESCRIPTION

Figure 1:
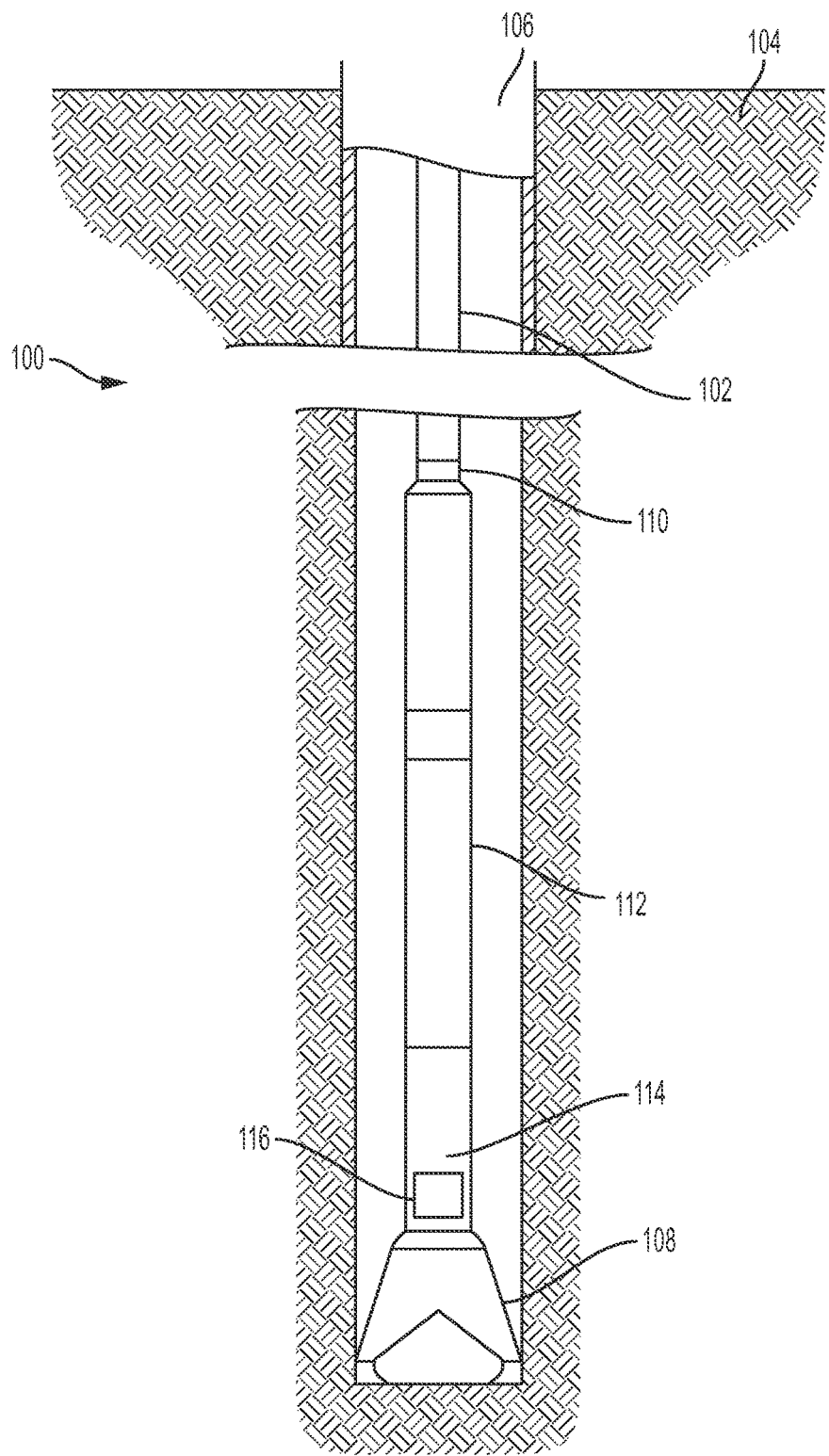
FIG. 1 is a cross-sectional schematic diagram depicting a drilling system that includes a driveshaft transmission assembly with a catch assembly in a lower end of a driveshaft transmission assembly according to one aspect of the present disclosure.

Certain aspects and examples of the present disclosure relate to a downhole driveshaft transmission assembly having a catch assembly coupled to a first radial bearing assembly and a second radial bearing assembly coupled to a bearing housing and thrust bearing assembly.

The catch assembly may include a catch mechanism. The catch assembly may be coupled to a radial bearing assembly of a driveshaft transmission assembly. In some aspects, the catch assembly may also include locking devices for coupling the catch mechanism radial bearing assembly. The catch mechanism may include ridges on the inner surface corresponding to shoulders on the radial bearing assembly. The ridges may be sized to be received by channels formed by the shoulders on the radial bearing assembly. The ridges may be spaced to form grooves on the downhole end of the catch mechanism that are sized to allow the shoulders on the radial bearing assembly to be received by the grooves. The ridges may also be spaced to correspond to the spacing of the shoulders so the ridges may be mounted to the shoulders for coupling the catch mechanism to the radial bearing assembly by a locking device.

In some aspects, the locking devices may be locking pins. The locking pins may be received into cavities on the catch mechanism extending from the outer diameter of the catch mechanism to the inner diameter of the catch mechanism. The locking pins may be inserted into the cavities such that an end portion of the locking pins are received by recesses on the radial bearing assembly. In other aspects, the locking devices may be locking keys. The locking keys may be received into cavities on the catch mechanism extending from notches on the uphole end of the catch mechanism to the grooves formed by the ridges on the downhole end of the catch mechanism.

In some aspects, the driveshaft transmission assembly may further include a second radial bearing assembly coupled to the radial bearing assembly having the catch assembly. The second radial bearing assembly may be interlockably coupled to a thrust bearing assembly and a bearing housing. For example, the second radial bearing assembly may include a protrusion on the uphole end of the second bearing assembly that may be received by an indentation on the thrust bearing assembly to interlockably couple the second radial bearing assembly to the thrust bearing assembly. The driveshaft transmission assembly may also include a housing nut coupled to the bearing housing for coupling the second radial bearing assembly to the bearing housing. In these aspects, the catch assembly (via the catch mechanism) may be threadably coupled to the radial bearing assembly or coupled to the radial bearing assembly via the locking devices.

Eliminating or reducing threading to couple certain components of the driveshaft transmission assembly (e.g., coupling the catch assembly to the radial bearing assembly, coupling the second radial bearing assembly to the thrust bearing assembly and bearing housing) may result in more cost-effective and efficient installation and maintenance of the driveshaft transmission assembly. The reduction of threaded components circumvents at least a portion of the heightened inspections and testing of the threaded components which may be both costly and time-consuming.

The terms "inner," "outer," "internal," and "between," as used in the present disclosure, may refer to a radial orientation toward or away from the center of the driveshaft transmission assembly. The terms "uphole," "downhole," and "proximate," as used in the present disclosure, may refer to an axial orientation toward or away from the surface. Each of these terms is used only to provide examples of relation and orientation of the driveshaft transmission components with respect to each other, and is not meant to limit the scope of the present disclosure.

Various aspects of the present disclosure may be implemented in various drilling systems. FIG. 1 illustrates an example of such a drilling system 100 that includes a drill string 102. The drill string 102 of a drilling rig (not shown) may include segmented pipes that may extend below the surface 104 in a borehole, such as a wellbore 106. The drill string 102 may transmit drilling fluid (or mud) and the torque necessary to operate a drill bit 108. Also, the weight of the drill string 102 may provide an axial force on the drill bit 108.

The drill string 102 may include a drill pipe 110 and a bottom hole assembly 112. The bottom hole assembly 112 may be include various components, such as a downhole motor assembly 114 and the drill bit 108.

Though placement of the assemblies disclosed herein may vary without departing from the scope of the present subject matter, the assemblies of the present disclosure may be included in the lower end of the downhole motor assembly 114 and near the drill bit 108. For example, the driveshaft transmission assembly 116 depicted in FIG. 1 represents a placement according to one example. Placement of the assemblies as close to the drill bit 108 as possible may reduce the moment arm load induced from directional drilling. Reducing the moment arm load may result in longevity of the motor assembly and bearings of the drilling installation, and may reduce the likelihood of failure of the motor.

During operation of the drilling system, dynamic loads may be placed on a drill motor by the action of the drill bit 108 and by vibrations of the drill string 102. In certain instances, the dynamic loads may cause the drill motor to fail and components of the driveshaft transmission assembly 116 to separate. The driveshaft transmission assembly 116 may include a catch assembly to prevent the loss of components downhole in the event of a separation.

Figure 2A:
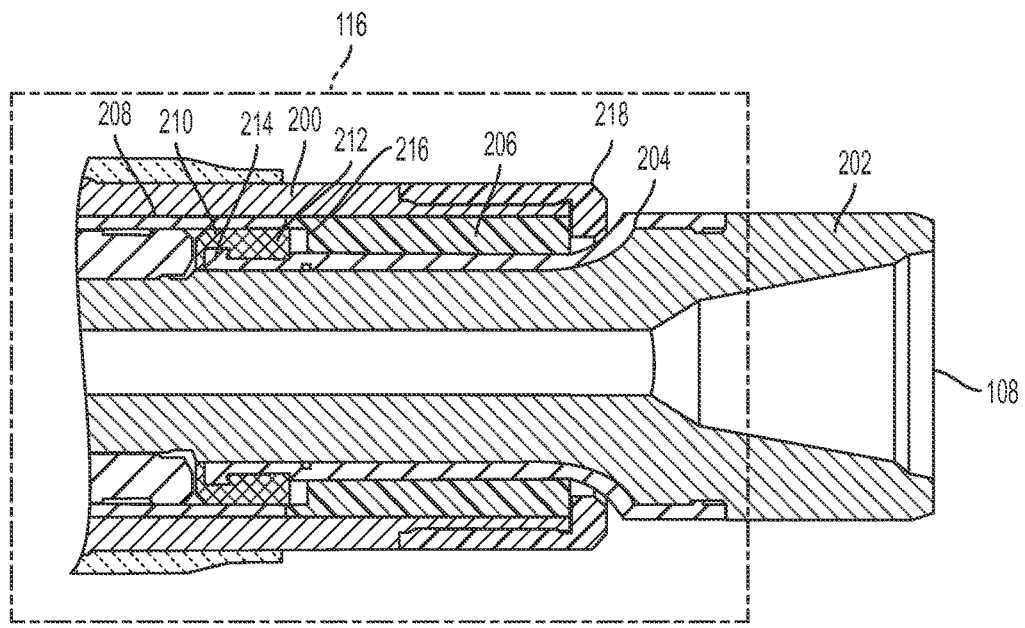
FIG. 2A is a cross-sectional view of a driveshaft transmission assembly having a catch assembly according to one aspect of the present disclosure.
Figure 2B:
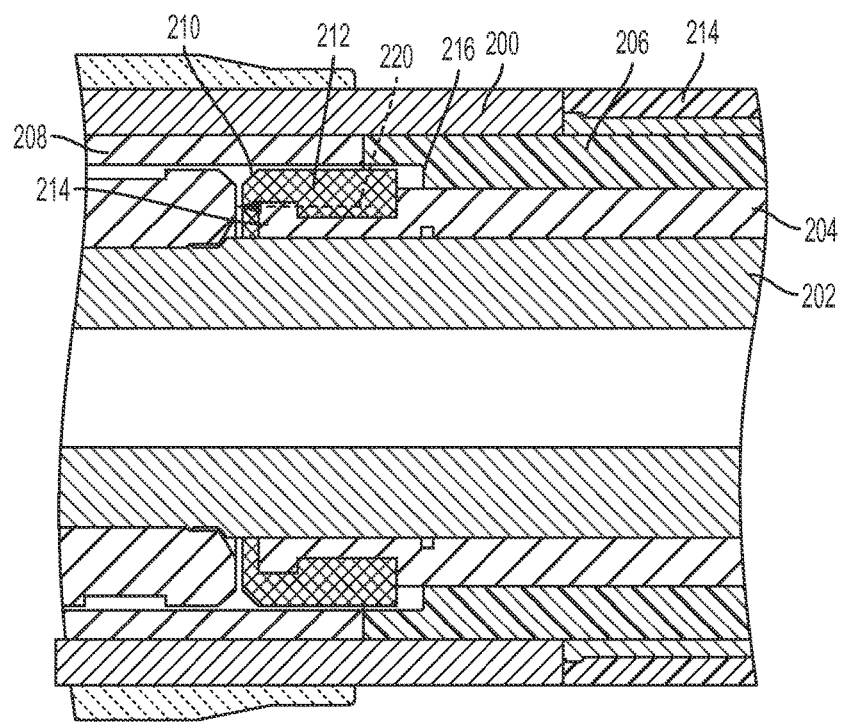
FIG. 2B is a cross-sectional view of part of the driveshaft transmission assembly of FIG. 2A according to one aspect of the present disclosure.

FIGS. 2A and 2B show an example of the driveshaft transmission assembly 116 that includes a catch assembly according to one aspect of the present disclosure. The driveshaft transmission assembly 116 also includes a bearing housing 200 and certain bearings for a driveshaft 202. The catch assembly may be separate from and independent of the bearing housing 200 and the driveshaft 202. One or more radial bearing assemblies and thrust bearing assemblies may be included internal to the bearing housing 200. For example, FIGS. 2A and 2B include a rotating radial bearing 204, a stationary radial bearing 206, and a thrust bearing sleeve 208 internal to the bearing housing 200. In some aspects, the rotating radial bearing 204 may be radially positioned between the driveshaft 202 and the stationary radial bearing 206 and may be coupled to the driveshaft 202. The stationary radial bearing 206 may be radially positioned between the rotating radial bearing 204 and the bearing housing 200. The stationary radial bearing 206 may be coupled to the bearing housing 200 and may be configured to support the driveshaft in the radial direction. The thrust bearing sleeve 208 may be radially positioned uphole of the stationary radial bearing 206. The stationary radial bearing 206 may be coupled to the thrust bearing sleeve 208 and may be configured to support the driveshaft in the axial direction. Although only these radial and thrust bearing assemblies are shown in FIGS. 2A and 2B, alternative or additional bearing assemblies may be included in various configurations in the driveshaft transmission assembly 116 without departing from the scope of the present disclosure.

The catch assembly in FIGS. 2A and 2B include a catch mechanism. The catch mechanism 210 received by the rotating radial bearing 204 such that the catch mechanism 210 encircles a portion of the rotating radial bearing 204. The catch mechanism 210 is radially positioned between the rotating radial bearing 204 and the bearing housing 200 and is independent of the bearing housing 200.

The catch mechanism may include ridges 212 on its inner surface. The ridges 212 may be positioned to align with shoulders 214 located on the rotating radial bearing 204. In some aspects, the catch mechanism 210 may be coupled to the rotating radial bearing 204 using locking devices. The rotating radial bearing 204 may be coupled to the stationary radial bearing 206. The stationary radial bearing 206 may include a contact shoulder 216 for interfering with the catch mechanism 210 in the event of separation of driveshaft transmission assembly components. The stationary radial bearing 206 may be coupled to the thrust bearing sleeve 208 on the uphole end of the stationary radial bearing 206. The stationary radial bearing 206 may be coupled to the thrust bearing sleeve. The stationary radial bearing 206 may also be coupled to the bearing housing 200 by a housing nut 218. The housing nut 218 may be threadably coupled to the outer surface of the bearing housing 200 such that the bearing housing 200 applies a compression force onto the stationary radial bearing 206. FIG. 2B further shows a shear load carrying path 220. The shear load carrying path 220 may be defined by the shoulders 214 on the rotating radial bearing 204.

Figure 3:
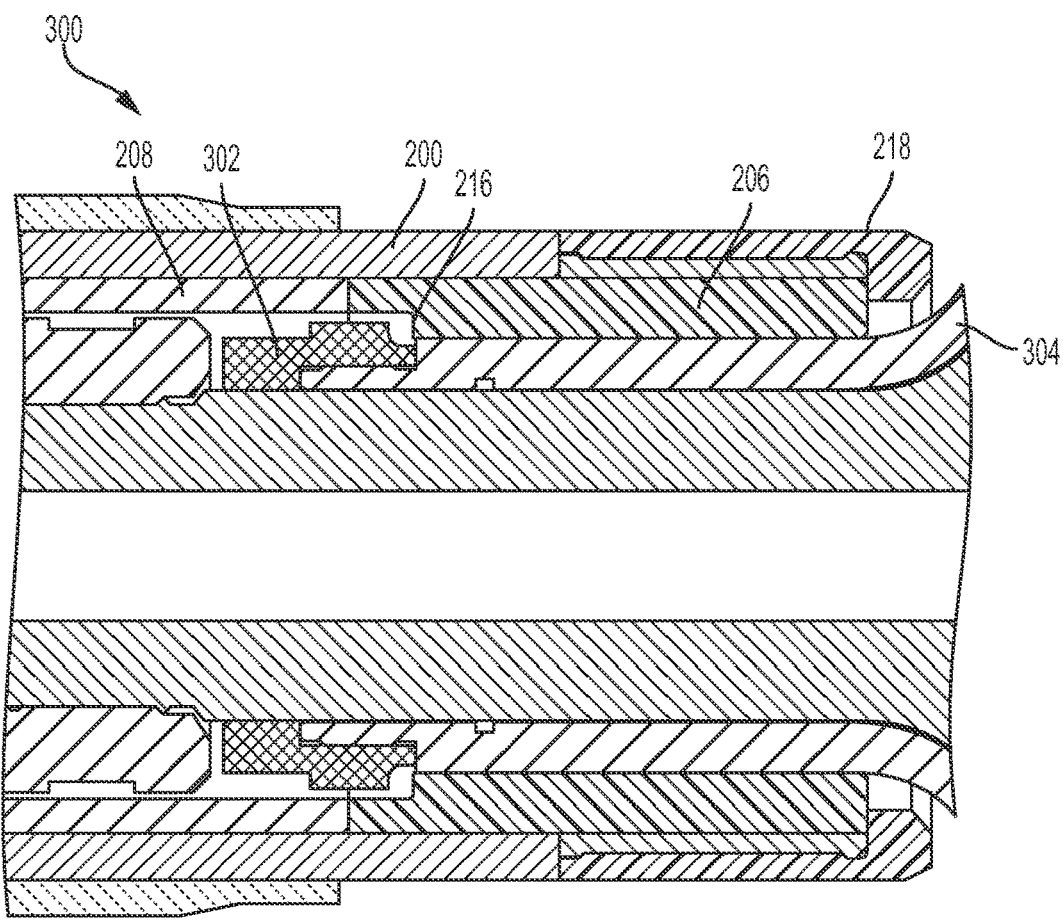
FIG. 3 is a cross-sectional view of a driveshaft transmission assembly having a catch assembly according to another aspect of the present disclosure.
Figure 4:
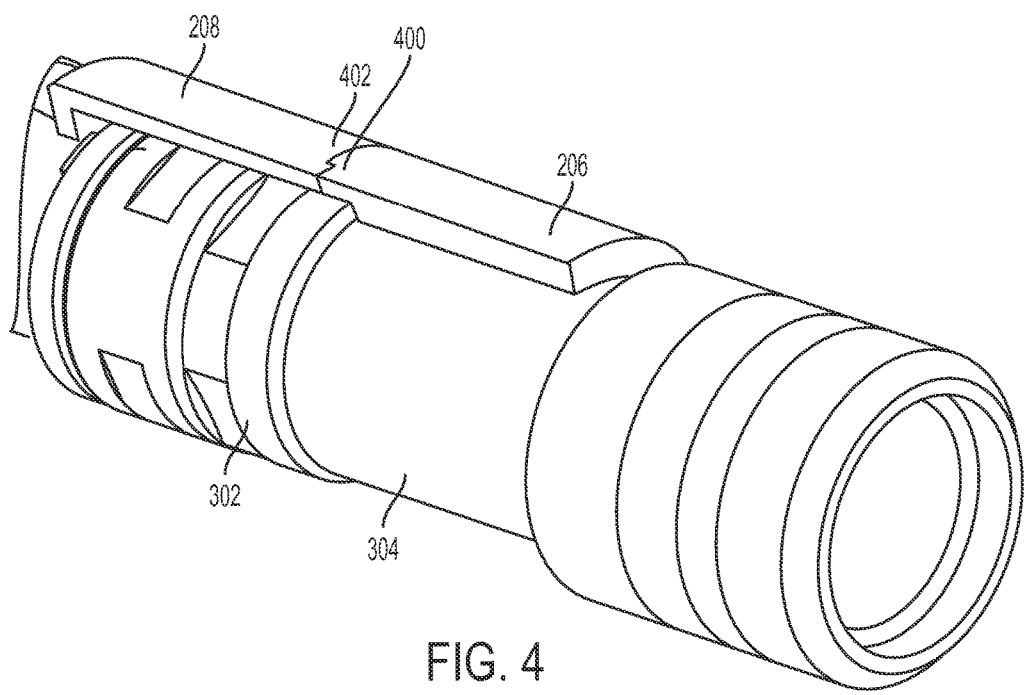
FIG. 4 is a partial cross-sectional view of the driveshaft transmission assembly of FIG. 3 according to one aspect of the present disclosure.

FIGS. 3 and 4 show an example of the driveshaft transmission assembly 300 that includes a catch assembly according to another example of the present disclosure. The catch assembly includes a catch mechanism 302 that may be threadably coupled to a rotating radial bearing 304. The catch mechanism 302 may include male or female threads on its inner surface and the rotating radial bearing 304 may include threads of an opposite gender (female or male) on its outer surface to couple the catch mechanism 302 to the rotating radial bearing 304. FIG. 4 further shows the interlocked coupling of the stationary radial bearing 206 to the thrust bearing sleeve 208. The stationary radial bearing 206 may include a protrusion 400 on the uphole end of the stationary radial bearing 206 that may be received by an indentation 402 on the downhole end of the thrust bearing sleeve 208. The stationary radial bearing 206 may be coupled to the thrust bearing sleeve 208 to support the stationary radial bearing 206 in the axial direction.

The catch mechanism 302 of the catch assembly may have an outer diameter greater than the outer diameter of the rotating radial bearing 304 as shown in FIGS. 2A, 2B, and 3. At least a portion of the catch mechanism 302 may extend beyond the outer diameter of the rotating radial bearing 304 when the catch mechanism 302 is coupled to the rotating radial bearing 304. Following a failure of the drill motor, the catch assembly of the driveshaft transmission assembly 300 may prevent certain components of the driveshaft transmission assembly 300, including the driveshaft 202 and drill bit 108, from falling, or being lost, downhole in the event of separation. For example, when a separation occurs, the outer surface of the catch mechanism 302 may create an interference with the contact shoulder 216 of the stationary radial bearing 206 to prevent the catch assembly from moving in a downhole direction beyond the contact shoulder 216. Because the catch mechanism 302 may be coupled to the rotating radial bearing 304, the interference of the catch mechanism 302 with the contact shoulder 216 of the stationary radial bearing 206 may prevent the rotating radial bearing 304 and any components directly or indirectly coupled thereto (e.g., driveshaft 202, drill bit 108) from falling downhole.

Figure 5:
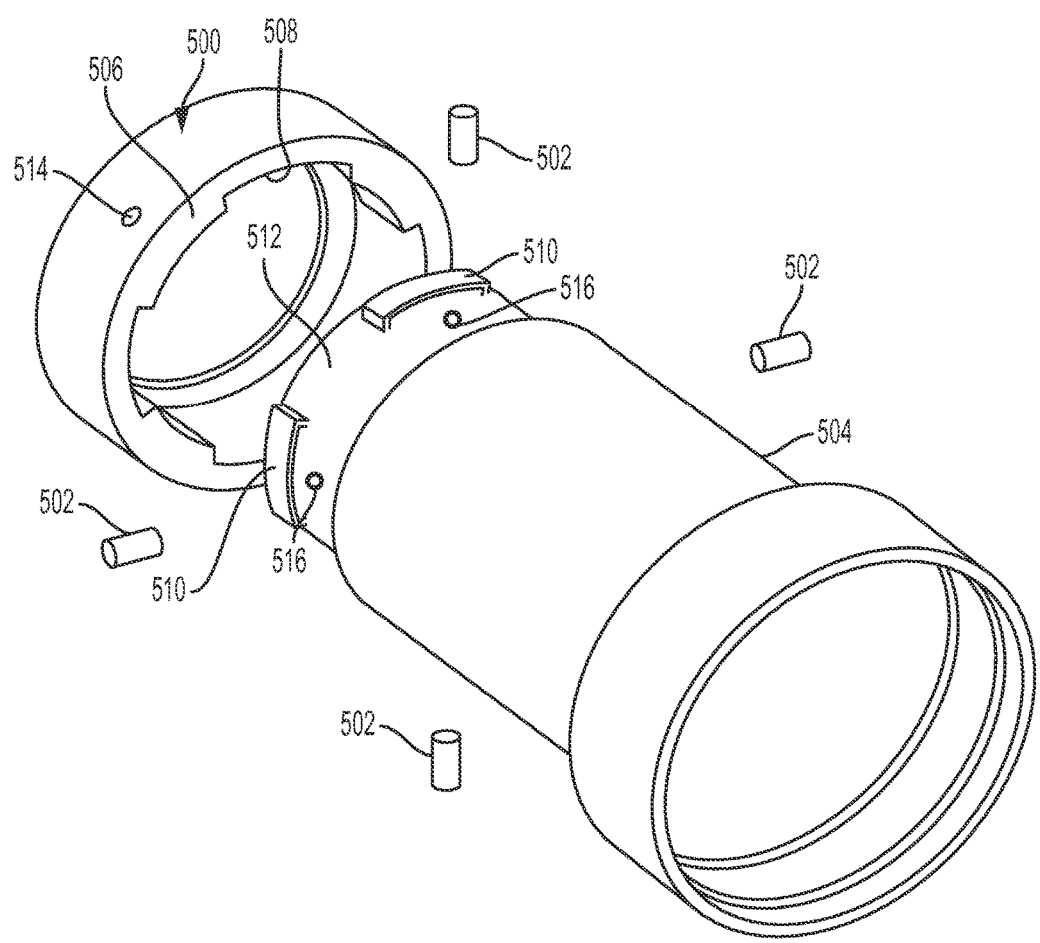
FIG. 5 is an exploded view of a catch assembly according to one aspect of the present disclosure.
Figure 6A:
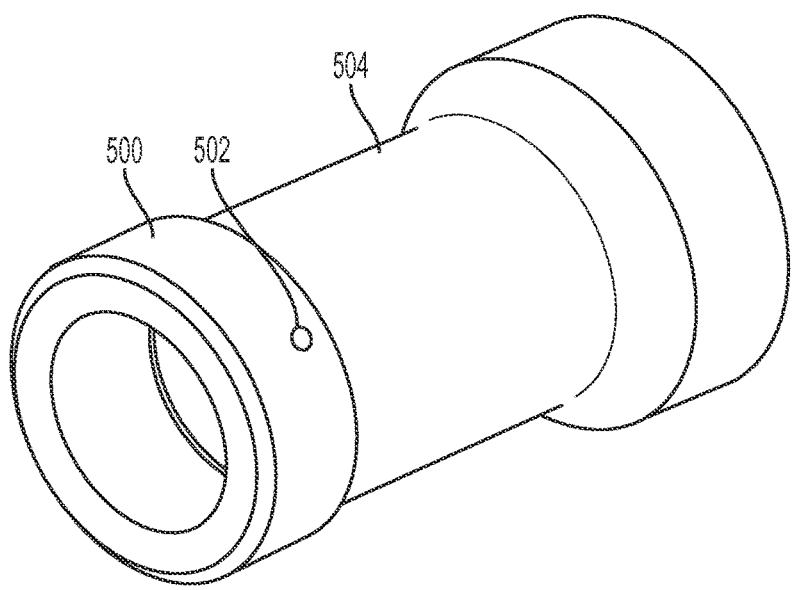
FIG. 6A is perspective view of an assembled catch assembly according to one aspect of the present disclosure.
Figure 6B:
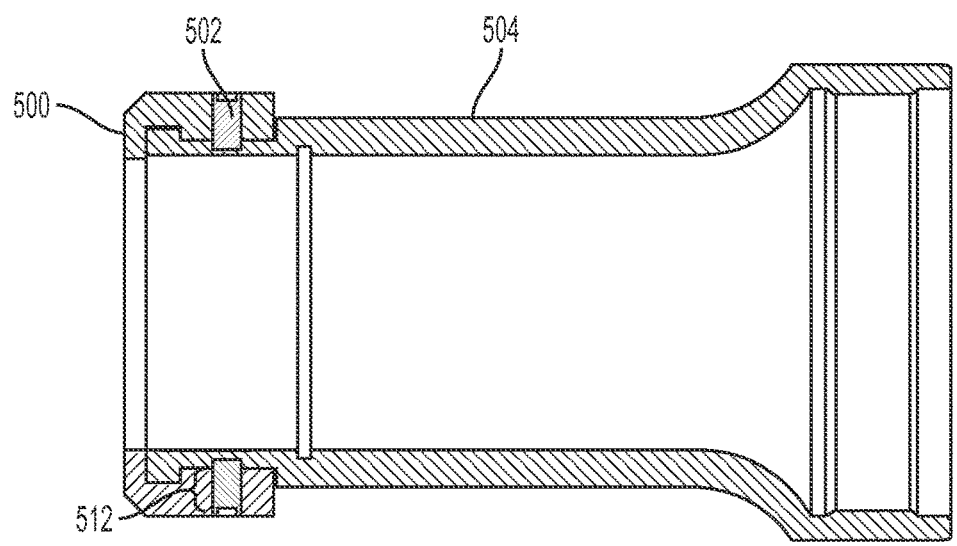
FIG. 6B is a cross-sectional view of the assembled catch assembly of FIG. 6A according to one aspect of the present disclosure.

FIGS. 5, 6A, and 6B illustrate an example of a catch assembly that may be used to prevent the loss of driveshaft transmission assembly components downhole. The catch assembly may include a catch mechanism 500 and locking pins 502 as locking devices to couple the catch mechanism 500 to a rotating radial bearing 504. Although four locking pins 502 are shown in FIG. 5, any number of locking pins 502 may be used as locking devices for the catch mechanism 500. The inner surface of the catch mechanism 500 may include ridges 506 and grooves 508. The ridges 506 may be positioned on the inner surface of the catch mechanism 500 to form the grooves 508 on the downhole inner surface of the catch mechanism 500. The grooves 508 may be sized to pass through shoulders 510 on the rotating radial bearing 504. The shoulders on the rotating radial bearing 504 may be positioned to form channels 512 on the rotating radial bearing 504. The shoulders 510 may further be positioned to pass through the grooves 508 on the catch mechanism 500. The channels 512 may be positioned to allow the ridges 506 to pass through.

The catch mechanism 500 may also include cavities 514. The cavities 514 on the catch mechanism 500 may extend from the outer diameter of the catch mechanism 500 to the inner diameter of the catch mechanism. The cavities 514 may be sized to receive the locking pins 502. The rotating radial bearing 504 may have recesses 516 corresponding to the cavities 514. The recesses 516 may be sized to receive an end portion of the locking pins 502 and may be positioned to align with the cavities 514 when the catch mechanism 500 is assembled on the rotating radial bearing 204. In some aspects, the recesses 516 may be positioned downhole of the shoulders 510 of the rotating radial bearing 504.

The catch assembly may be installed on the rotating radial bearing 504 by sliding the catch mechanism 500 onto the rotating radial bearing 504. As the catch mechanism 500 is slid onto the rotating radial bearing 504, the ridges 506 on the catch mechanism 500 may pass through the channels 512 on the rotating radial bearing 504 and the shoulders 510 on the rotating radial bearing 504 may pass through the grooves 508 on the catch mechanism 500. The catch mechanism 500 or the rotating radial bearing 504 may be rotated such that the ridges 506 and cavities 514 on the catch mechanism 500 align with the shoulders 510 and recesses 516 on the rotating radial bearing 504, respectively. The locking pins 502 may be inserted into the cavities 514 on the catch mechanism 500 until the end portions of the locking pins 502 are inserted into the recesses of the rotating radial bearing 504 to couple the catch mechanism 500 to the rotating radial bearing 504. The locking pins 502 may be sized to extend the length of the cavities 514 and the length of the recesses 516. FIGS. 6A and 6B show a catch assembly that is assembled on the rotating radial bearing 504.

Figure 7:
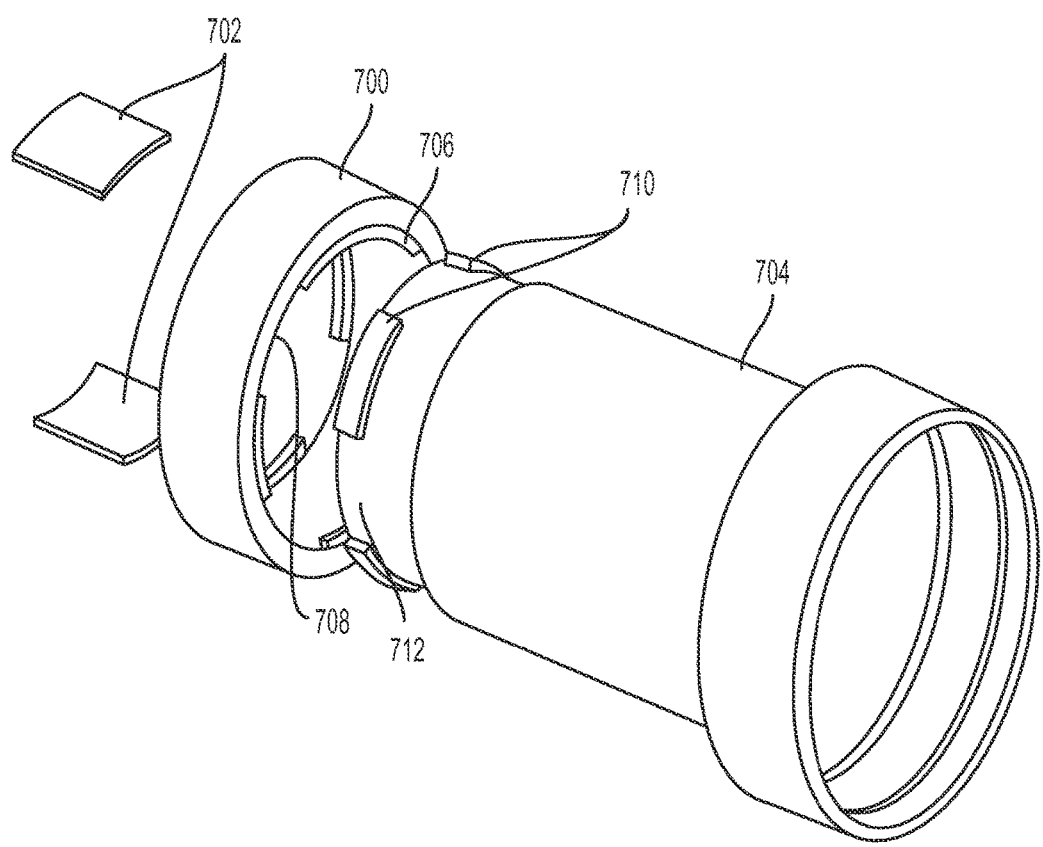
FIG. 7 is an exploded view of a catch assembly for a driveshaft transmission assembly according to another aspect of the present disclosure.
Figure 8A:
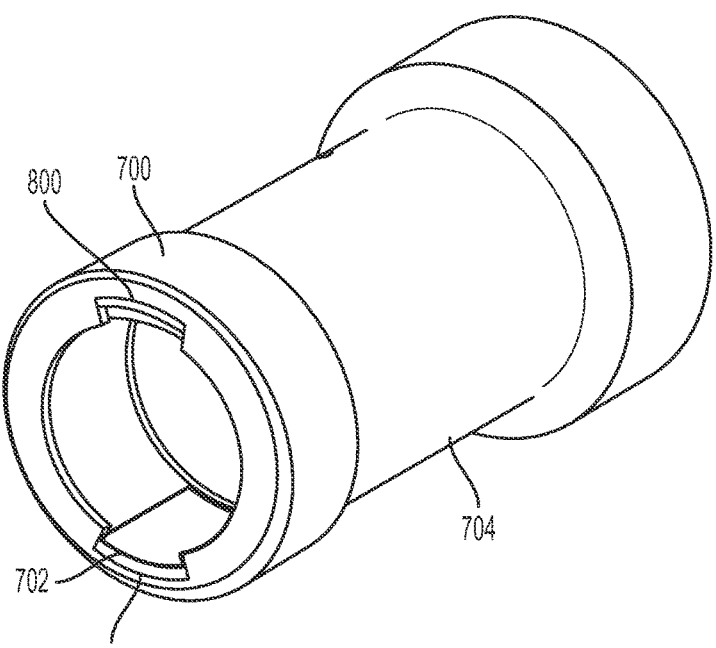
FIG. 8A is perspective view of an assembled catch assembly according to one aspect of the present disclosure.
Figure 8B:
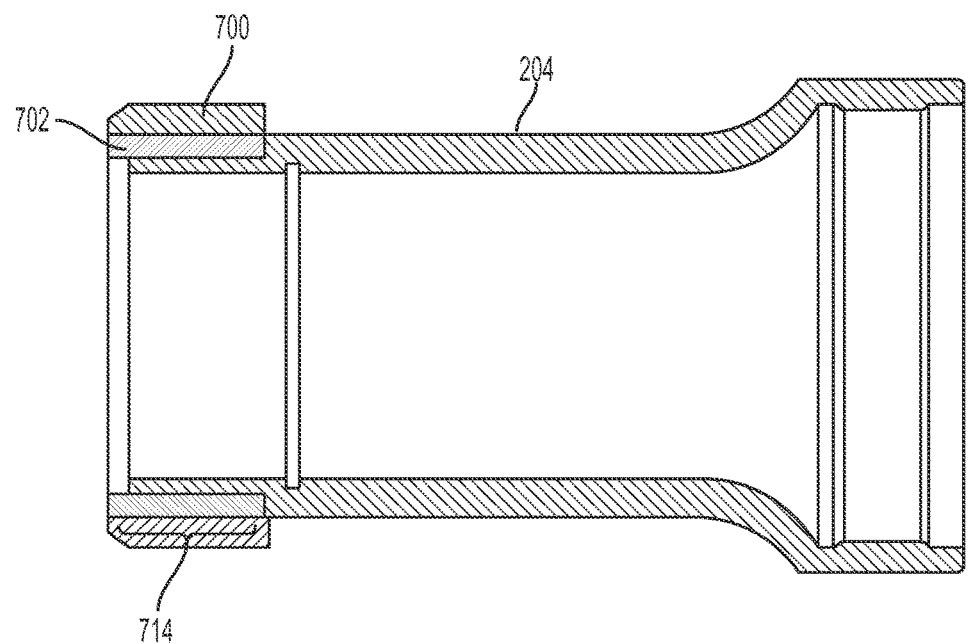
FIG. 8B is a cross-sectional view of the assembled catch assembly of FIG. 8A according to one aspect of the present disclosure.

FIGS. 7, 8A, and 8B illustrate another example of a catch assembly that may be used to prevent the loss of driveshaft transmission assembly components downhole. The catch assembly may include a catch mechanism 700 and locking keys 702 as locking devices to couple the catch mechanism 700 to the rotating radial bearing 704. Although two locking keys 702 are shown in FIG. 7, any number of locking keys 702 may be used as locking devices for the catch mechanism 700. The inner surface of the catch mechanism 700 may include ridges 706 and grooves 708. The ridges 706 may be positioned on the inner surface of the catch mechanism 700 to form the grooves 708 on the downhole inner surface of the catch mechanism 700. The grooves 708 may be sized to pass through shoulders 710 on the rotating radial bearing 704. The shoulders 710 on the rotating radial bearing 704 may be positioned to form channels 712 on the rotating radial bearing 704. The shoulders 710 may further be positioned to pass through the grooves 708 on the catch mechanism 700 and the channels 712 may be positioned to allow the ridges 706 to pass through.

The catch mechanism 700 may also include notches 800 on the uphole portion of the catch mechanism 700 as shown in FIG. 8A. The notches 800 may be sized to allow the locking keys 702 to pass through. The catch mechanism 700 may also include cavities 802 that extend from the notches 800 on the uphole portion of the catch mechanism 700 to the grooves 708 on the downhole portion of the catch mechanism 700 as shown in FIG. 8B. The cavities 802 may be sized to receive the locking keys 702.

The catch assembly may be installed on the rotating radial bearing 704 by sliding the catch mechanism 700 onto the rotating radial bearing 704. As the catch mechanism 700 is slid onto the rotating radial bearing 704, the ridges 706 on the catch mechanism 700 may pass through the channels 712 on the rotating radial bearing 704 and the shoulders 710 on the rotating radial bearing 704 may pass through the grooves 708 on the catch mechanism 700. The catch mechanism 700 or the rotating radial bearing 704 may be rotated such that the ridges 706 align with the shoulders 710 on the rotating radial bearing 704. The locking keys 702 may be inserted into the cavities 802 on the catch mechanism 700 until the end portions of the locking keys 702 contact an enlarged portion of the rotating radial bearing 704 to couple the catch mechanism 700 to the rotating radial bearing 704. In some aspects, a retaining mechanism (e.g., a ring, sleeve) may be included to hold the locking keys 702 in place in the cavities 802. The locking keys 702 may be sized extend the length of the cavities 802 and may be shaped to have the same curvature as the rotating radial bearing 704 or catch mechanism 700. FIGS. 8A and 8B show a catch assembly that is assembled on the rotating radial bearing 704.

In some aspects, assemblies for preventing the loss of driveshaft transmission assembly components are provided according to one or more of the following examples:

Example #1

A driveshaft transmission assembly may include a first radial bearing assembly coupled to a driveshaft and having a catch assembly positionable to prevent a loss of driveshaft transmission assembly components downhole subsequent to components of the driveshaft transmission assembly separation. The driveshaft transmission assembly may also include a second radial bearing assembly coupled to a thrust bearing assembly by a protrusion on the second radial bearing assembly interlocked with an indentation in the thrust bearing assembly.

Example #2

The driveshaft transmission assembly of Example #1 may feature the catch assembly including a catch mechanism coupled to the first radial bearing assembly by locking pins. The locking pins may be positioned in cavities in the catch mechanism. The cavities may extend from an outer diameter of the catch mechanism to an inner diameter of the catch mechanism. The locking pins may have end portions that are positioned in corresponding recesses on the first radial bearing assembly.

Example #3

The driveshaft transmission assembly of Example #1 may feature the catch assembly including a catch mechanism coupled to the first radial bearing assembly by locking keys. The locking keys may be positioned in cavities in the catch mechanism. The cavities may extend from uphole notches in the catch mechanism to downhole grooves on the catch mechanism.

Example #4

The driveshaft transmission assembly of any of Examples #1-3 may feature the second radial bearing assembly being further coupled to a bearing housing by a housing nut. The housing nut may be threadably coupled to the bearing housing. The second radial bearing assembly may be positioned between the first radial bearing assembly and the bearing housing.

Example #5

The driveshaft transmission assembly of any of Examples #1-4 may feature the protrusion on the second radial bearing assembly being positioned in the indentation on the thrust bearing assembly to prevent rotational movement of the second radial bearing assembly.

Example #6

The driveshaft transmission assembly of any of Examples #1-5 may feature the second radial bearing assembly being positioned downhole of the thrust bearing assembly. The second radial bearing assembly may include a contact shoulder for interfering with at least a portion of the catch assembly subsequent to the components of the driveshaft transmission assembly separating.

Example #7

The driveshaft transmission assembly of any of Examples #1-6 may feature the catch assembly including a catch mechanism coupled the first radial bearing assembly. The first radial bearing assembly may be coupled to the second radial bearing assembly. The first radial bearing assembly may be positioned between the driveshaft and the second radial bearing assembly.

Example #8

The driveshaft transmission assembly of any of Examples #1-7 may feature the catch assembly being independent of and internal to a bearing housing. The catch assembly may be positioned uphole of a contact shoulder on the second radial bearing assembly for interfering with at least a portion of the catch assembly subsequent to the components of the driveshaft transmission assembly separating.

Example #9

A catch assembly for a driveshaft transmission assembly may include a catch mechanism having an inner diameter that is sized to be coupled to a radial bearing assembly. The catch mechanism may also have an outer diameter sized to extend radially beyond an outer diameter of the radial bearing assembly. The catch assembly may include ridges being positionable proximate to corresponding shoulders on the radial bearing assembly. The catch assembly may also include cavities being sized to receive locking devices configured to couple the catch mechanism to the radial bearing assembly.

Example #10

The catch assembly of Example #9 may feature the outer diameter of the catch mechanism being positionable on the radial bearing assembly to prevent a loss of driveshaft transmission assembly components downhole subsequent to components of the driveshaft transmission assembly separating. The outer diameter of the catch mechanism may interfere with a second radial bearing assembly that is coupled to a thrust bearing assembly by a protrusion on the second radial bearing assembly interlocked with an indentation in the thrust bearing assembly.

Example #11

The catch assembly of any of Examples #9-10 may feature the ridges being positionable to form downhole grooves on the catch mechanism. The downhole grooves may be sized to receive the corresponding shoulders on the radial bearing assembly.

Example #12

The catch assembly of any of Examples #9-11 may further include the locking devices. The locking devices may be locking pins positionable in the cavities. The locking pins may have end portions positionable in corresponding recesses on the radial bearing assembly. The cavities may extend from the outer diameter of the catch mechanism to the inner diameter of the catch mechanism. The cavities may be positionable proximate to the corresponding recesses on the radial bearing assembly.

Example #13

The catch assembly of any of Examples #9-11 may further include the locking devices. The locking devices may be locking keys positionable in the cavities and between the catch mechanism and the radial bearing assembly. The cavities may extend along the inner diameter of the catch mechanism from uphole notches on the catch mechanism to downhole grooves on the catch mechanism.

Example #14

The catch assembly of any of Examples #9-13 may feature the catch mechanism coupled to the radial bearing assembly. The radial bearing assembly may be coupled to a driveshaft.

Example #15

The catch assembly of Example 14 may feature the radial bearing assembly further coupled to a second radial bearing assembly. The second radial bearing assembly may be coupled to a thrust bearing assembly by a protrusion on the second radial bearing assembly interlocked with an indentation in the thrust bearing assembly.

Example #16

A driveshaft transmission assembly including a first radial bearing assembly having a catch assembly positionable to prevent a loss of driveshaft transmission assembly components downhole subsequent to components of the driveshaft transmission assembly separating. The driveshaft transmission assembly may also include a second radial bearing assembly having a protrusion on an uphole end of the second radial bearing assembly. The driveshaft transmission assembly may additionally include an indentation on a downhole end of the thrust bearing assembly. The indentation may be sized to receive the protrusion on the second radial bearing assembly for coupling the second radial bearing assembly to the thrust bearing assembly.

Example #17

The driveshaft transmission assembly of Example #16 may feature the catch assembly including a catch mechanism having ridges and cavities. The cavities may extend from an outer diameter of the catch mechanism to an inner diameter of the catch mechanism. The cavities may be sized to receive locking pins. The first radial bearing assembly may include shoulders and recesses. The shoulders may be positionable proximate to the ridges of the catch mechanism. The recesses may be positionable proximate to the cavities of the catch mechanism. The recesses may be sized to receive an end portion of the locking pins.

Example #18

The driveshaft transmission assembly of Example #16 may feature the catch assembly including a catch mechanism having cavities. The cavities may extend from uphole notches in the catch mechanism to downhole grooves on the catch mechanism. The cavities may be sized to receive locking keys. The first radial bearing assembly may include shoulders positionable to create channels. The channels may be sized to receive the locking keys.

Example #19

The driveshaft transmission assembly of any of Examples #16-18 may feature the catch assembly including a catch mechanism having threads on an inner diameter of the catch mechanism to couple the catch mechanism to the first radial bearing assembly.

Example #20

The driveshaft transmission assembly of any of Examples #16-19 may feature the first radial bearing assembly being threadably coupled to a driveshaft. The second radial bearing assembly may be coupled to the thrust bearing assembly by interlocking the protrusion on the second radial bearing assembly with the indentation in the thrust bearing assembly.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A driveshaft transmission assembly, comprising:
   a first radial bearing assembly coupled to a driveshaft, the first radial bearing assembly having a catch assembly positionable to prevent a loss of driveshaft transmission assembly components downhole subsequent to components of the driveshaft transmission assembly separating, the catch assembly including a catch mechanism; and
   a second radial bearing assembly coupled to a thrust bearing assembly by a protrusion on the second radial bearing assembly interlocked with an indentation in the thrust bearing assembly, wherein the second radial bearing assembly comprises a stationary radial bearing extending between a bearing housing and the catch mechanism, the stationary radial bearing being coupled to the bearing housing by a housing nut that extends inward so that a portion of the housing nut is axially between the stationary radial bearing and a rotating radial bearing with a rotating radial bearing shoulder protruding into the catch mechanism so that the catch mechanism extends axially above and below the rotational radial bearing shoulder to define a shear load carrying path.

2. The driveshaft transmission assembly of claim 1, wherein the catch mechanism is coupled to the first radial bearing assembly by locking pins, the locking pins being positioned in cavities in the catch mechanism that extend from an outer diameter of the catch mechanism to an inner diameter of the catch mechanism, the locking pins having end portions positioned in corresponding recesses on the first radial bearing assembly.

3. The driveshaft transmission assembly of claim 1, wherein the catch mechanism is coupled to the first radial bearing assembly by locking keys, the locking keys being positioned in cavities in the catch mechanism that extend from uphole notches in the catch mechanism to downhole grooves on the catch mechanism.

4. The driveshaft transmission assembly of claim 1, wherein the housing nut is threadably coupled to the bearing housing, the second radial bearing assembly being positioned between the first radial bearing assembly and the bearing housing.

5. The driveshaft transmission assembly of claim 1, wherein the protrusion on the second radial bearing assembly is positioned in the indentation on the thrust bearing assembly to prevent movement of the second radial bearing assembly.

6. The driveshaft transmission assembly of claim 1, wherein the second radial bearing assembly is positioned downhole of the thrust bearing assembly and the stationary radial bearing includes a contact shoulder uphole from the housing nut for interfering with at least a portion of the catch assembly subsequent to the components of the driveshaft transmission assembly separating.

7. The driveshaft transmission assembly of claim 1, wherein the catch mechanism is coupled to the first radial bearing assembly;
   wherein the first radial bearing assembly is coupled to the second radial bearing assembly, and
   wherein the first radial bearing assembly is positioned between the driveshaft and the second radial bearing assembly.

8. The driveshaft transmission assembly of claim 1, wherein the catch assembly is independent of and internal to a bearing housing and is positioned uphole of a contact shoulder on the stationary radial bearing for interfering with at least a portion of the catch assembly subsequent to the components of the driveshaft transmission assembly separating.

9. A catch assembly for a driveshaft transmission assembly, the catch assembly comprising:
a catch mechanism having an inner diameter sized to be coupled to a radial bearing assembly and an outer diameter sized to extend radially beyond an outer diameter of the radial bearing assembly, the catch mechanism being sized and shaped so that a portion of the catch mechanism extends downhole to be radially between a portion of a stationary radial bearing and a portion of a rotational radial bearing with a rotational radial bearing shoulder protruding into the catch mechanism so that the catch mechanism extends axially above and below the rotational radial bearing shoulder to define a shear load carrying path, the catch mechanism including:
ridges being positionable proximate to corresponding shoulders on the radial bearing assembly, and
cavities being sized to receive locking pins or locking keys configured to couple the catch mechanism to the radial bearing assembly.

10. The catch assembly of claim 9, wherein the outer diameter of the catch mechanism is positionable on the radial bearing assembly to prevent a loss of driveshaft transmission assembly components downhole, subsequent to components of the driveshaft transmission assembly separating, by interfering with a second radial bearing assembly that includes the stationary radial bearing and the rotational radial bearing and that is coupled to a thrust bearing assembly by a protrusion on the second radial bearing assembly interlocked with an indentation in the thrust bearing assembly.

11. The catch assembly of claim 9, wherein the ridges are positionable to form downhole grooves on the catch mechanism, the downhole grooves being sized to receive the corresponding shoulders on the radial bearing assembly.

12. The catch assembly of claim 9 further comprising the locking pins,
the locking pins being positionable in the cavities, the locking pins having end portions positionable in corresponding recesses on the radial bearing assembly; and
wherein the cavities extend from the outer diameter of the catch mechanism to the inner diameter of the catch mechanism and are positionable proximate to the corresponding recesses on the radial bearing assembly.

13. The catch assembly of claim 9, further comprising the locking keys,
the locking keys positionable in the cavities and between the catch mechanism and the radial bearing assembly; and
wherein the cavities extend along the inner diameter of the catch mechanism from uphole notches on the catch mechanism to downhole grooves on the catch mechanism.

14. The catch assembly of claim 9, wherein the catch mechanism is coupled to the radial bearing assembly, the radial bearing assembly being coupled to a driveshaft.

15. The catch assembly of claim 14, wherein the radial bearing assembly is further coupled to a second radial bearing assembly that includes the stationary radial bearing and the rotational radial bearing and that is coupled to a thrust bearing assembly by a protrusion on the second radial bearing assembly interlocked with an indentation in the thrust bearing assembly.

16. A driveshaft transmission assembly, comprising:
a first radial bearing assembly having a catch assembly positionable to prevent a loss of driveshaft transmission assembly components downhole subsequent to components of the driveshaft transmission assembly separating, the catch assembly including a catch mechanism;
a second radial bearing assembly having a protrusion on an uphole end of the second radial bearing assembly, wherein the second radial bearing assembly comprises a stationary radial bearing extending between a bearing housing and the catch mechanism, the stationary radial bearing being coupled to the bearing housing by a housing nut that extends inward so that a portion of the housing nut is axially between the stationary radial bearing and a rotating radial bearing with a rotating radial bearing shoulder protruding into the catch mechanism so that the catch mechanism extends axially above and below the rotational radial bearing shoulder to define a shear load carrying path; and
a thrust bearing assembly having an indentation on a downhole end of the thrust bearing assembly, the indentation being sized to receive the protrusion on the second radial bearing assembly for coupling the second radial bearing assembly to the thrust bearing assembly.

17. The driveshaft transmission assembly of claim 16, wherein the catch mechanism includes ridges and cavities, the cavities extending from an outer diameter of the catch mechanism to an inner diameter of the catch mechanism and being sized to receive locking pins and; and
wherein the first radial bearing assembly includes pass through shoulders and recesses, the pass through shoulders being positionable proximate to the ridges of the catch mechanism, and the recesses being positionable proximate to the cavities of the catch mechanism and sized to receive an end portion of the locking pins.

18. The driveshaft transmission assembly of claim 16, wherein the catch assembly includes a catch mechanism having cavities extending from uphole notches in the catch mechanism to downhole grooves on the catch mechanism and being sized to receive locking keys; and
wherein the first radial bearing assembly includes pass through shoulders positionable to create channels that are sized to receive the locking keys.

19. The driveshaft transmission assembly of claim 16, wherein the catch assembly includes a catch mechanism having threads on an inner diameter of the catch mechanism to couple the catch mechanism to the first radial bearing assembly.

20. The driveshaft transmission assembly of claim 16, wherein the first radial bearing assembly is threadably coupled to a driveshaft; and
wherein the second radial bearing assembly is coupled to the thrust bearing assembly by interlocking the protrusion on the second radial bearing assembly with the indentation in the thrust bearing assembly.

* * * * *